Oct. 9, 1945.  E. D. LILJA  2,386,402
POWER ACTUATOR
Filed Jan. 13, 1943  2 Sheets-Sheet 1

INVENTOR
Edgar D. Lilja
BY
Parker, Carlson, Pitzner & Hubbard
ATTORNEYS

Oct. 9, 1945.  E. D. LILJA  2,386,402
POWER ACTUATOR
Filed Jan. 13, 1943  2 Sheets-Sheet 2
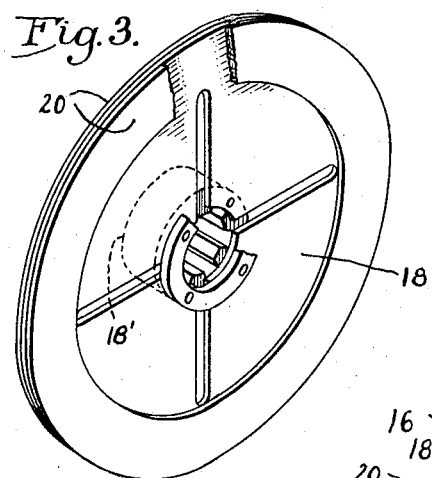
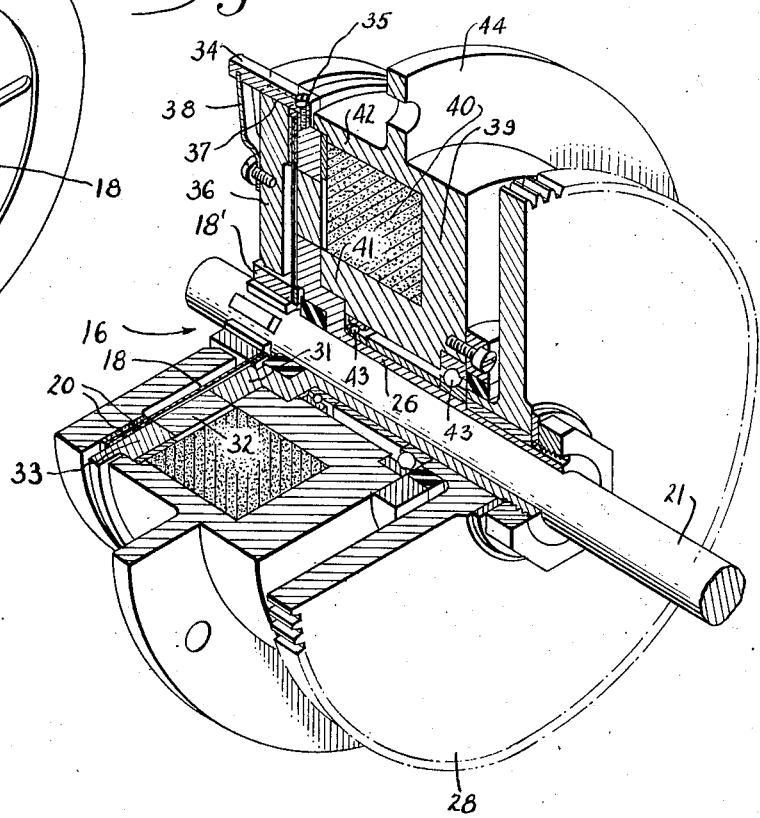
INVENTOR
Edgar D. Lilja
ATTORNEYS Patented Oct. 9, 1945

2,386,402

UNITED STATES PATENT OFFICE 2,386,402

POWER ACTUATOR

Edgar D. Lilja, Rockford, Ill., assignor to Barber-Colman Company, Rockford, Ill., a corporation of Illinois Application January 13, 1943, Serial No. 472,265

9 Claims. (Cl. 74—388)

This invention relates to a power driven actuator or servo for variably positioning a driven element to cause it to follow accurately the positional changes of a controlling element. More particularly, the invention relates to actuators of the type in which a frictionally driven flywheel is utilized to prevent hunting.

In prior actuators of this type, the flywheel is connected frictionally to one element of a gear train directly driven by a reversible electric motor, the direction and extent of operation of which is controlled by switches responsive to changes in the position of the controlling element and also to the movements of the driven element thereby producing the follow-up action. With such systems, I have found that it is impossible to position the driven element with the accuracy required for many applications. This is because the motor must develop enough torque to accelerate the flywheel, the load and the mass of the rotating parts, a large part of which is due to the rotor of the motor. Increasing the size of the motor to compensate for its own inertia further increases the rotor inertia, which must be compensated for by an increase in the flywheel inertia, and this in turn increases the torque demand on the motor. As a result, the size, weight, and cost of motor and flywheel become excessive and accurate direct control of the motor by sensitive contacts is rendered impractical. Moreover, maintenance of the contacts becomes a serious problem.

The primary object of the present invention is to provide a friction flywheel type of power actuator adapted to position a driven element with much greater accuracy and stability than has been possible heretofore. This object is attained by providing for the delivery of energy to the driving train intermittently without subjecting the train to the inertia of the power source such as a motor rotor.

A more detailed object is to provide a friction flywheel servo in which energy is applied to the driving train selectively through the medium of low inertia power transmitting devices such as friction clutches.

Another object is to provide an electrical actuator of the character described in which the engagement of the clutches is controlled magnetically with a resultant substantial decrease in the burden on the controlling switches.

A further object is to effect an additional reduction in the inertia imposed on the driving train through the use of friction clutches of special construction.

Other objects and advantages of the invention will become apparent from the following detailed description taken in connection with the accompanying drawings in which Figure 1 is a schematic view of the improved power actuator and its control.

Fig. 2 is a fragmentary perspective view of one of the friction clutches.

Fig. 3 is a perspective view of one of the clutch elements.

Figure 1:
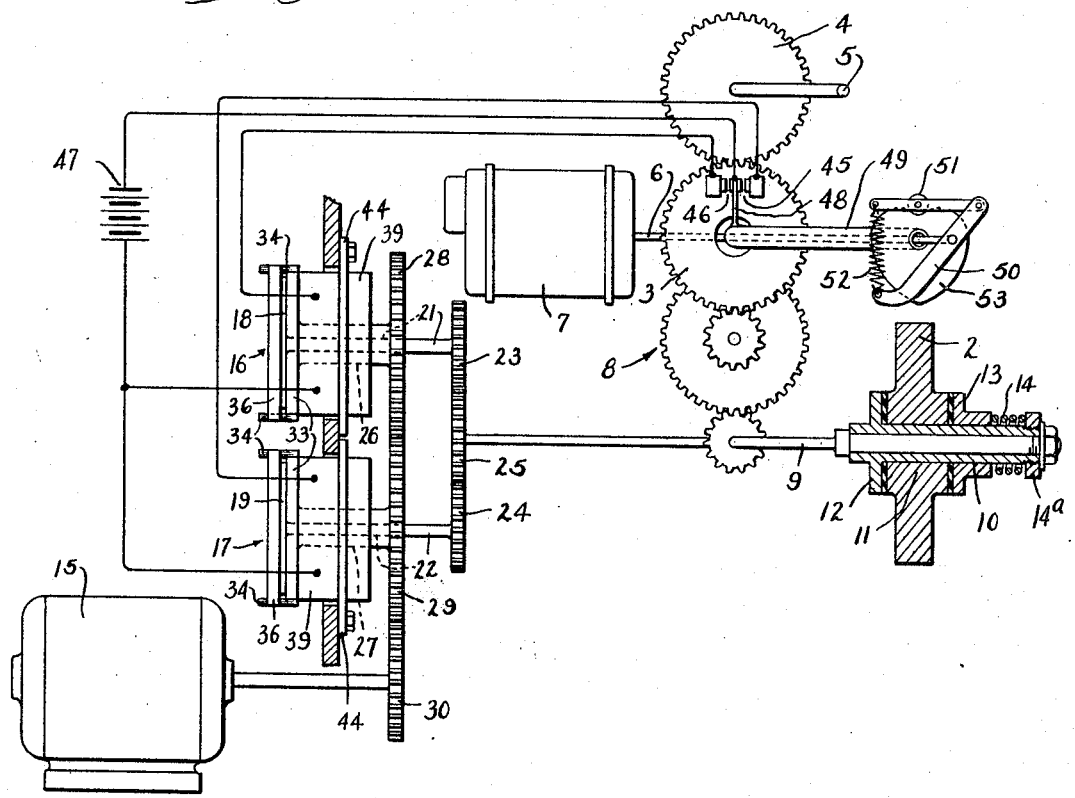

The power actuator or servo shown in the drawings by way of illustration operates to carry a load (not shown) connected to a driven element or shaft 5 and to cause the latter to follow precisely the movements of a controlling element which may, for example, be the rotor shaft 6 of a so-called Selsyn receiver 7. The shaft 5 carries a gear 4 meshing with the terminal gear 3 of a speed reduction train 8. The high speed member of this train is on a shaft 9 coupled to a flywheel 2 through a friction connection which acts to prevent hunting in a manner to be described later. To provide this connection, a sleeve 10 keyed to the shaft 9 carries the flywheel hub 11 which is pressed between the flange 12 on the sleeve and a collar 13 slidable on the sleeve and urged toward the hub by a compression spring 14, the stress in which may be varied by adjusting a nut 14ª.

In accordance with the present invention, energy derived from a constantly operating source such as a unidirectional motor 15 is applied to the driving train and flywheel intermittently and in different directions without imposing the inertia of the motor rotor on the system. To this end, the power is transmitted selectively in one direction or the other through friction clutches 16 and 17 which are specially constructed so as to minimize the inertia of their rotating driven parts. In the present instance, the driven elements of the clutches comprise thin disks 18 and 19 preferably of magnetic material covered in this instance with thin rings 20 of cork or other friction material. These disks, which may be slotted radially to minimize warping, have hubs 18' which are fast on the ends of shafts 21 and 22 that carry gears 23 and 24 meshing with a gear on the flywheel shaft 9.

Herein the shafts 21 and 22 are journaled intermediate their ends in sleeves 26 and 27 which carry gears 28 and 29 meshing with each other and driven by the motor 15 through a gear 30 that meshes with the gear 29. The sleeves, which are thus driven constantly in opposite directions, carry the driving elements of the clutches which are arranged in pairs on opposite sides of the driven disk. Each comprises a flange 31, a connected ring 32 of non-magnetic material, and an outer connected ring 33. Keys 34 secured to the ring 33 by screws 35 project across the outer end of the disk into notches 37 on the periphery of a plate 36 which is loose on the hub 18' and is thus driven from the ring 33. Leaf springs 38 carried by the plate 36 act on the keys 34 to urge the ring 33 toward the plate and thus maintain light mechanical contact at all times between opposite friction faces of the disk 18 and the ring and plate.

The rotating flange 31, the ring 33, and the plate 36 form part of a magnetic circuit through the disk 18 which circuit is energized by a stationary magnet 39 of U-shaped cross-section having an annular winding disposed between inner and outer poles 41 and 42 with faces disposed closely adjacent the flange 31 and the ring 33. This relation is maintained by journaling the sleeve 26 in bearings 43 within the magnet which has a flange 44 secured to a suitable frame by which the entire clutch structure is supported. It will be apparent that the flange 31 and the ring 33 constitute extensions of the magnet poles and that the plate 36 constitutes the magnet armature so that the disk 18 will be gripped between these pole extensions and the armature when the magnet winding is energized. As a result, a magnetic circuit of the proper area is provided independently of the mass of the driven clutch element which therefore may be made thin and therefore of very low inertia.

When the magnet of the clutch 16 is energized, the disk 18 will be gripped by its driving elements, and rotary motion in one direction will be imparted to the driving train 8. Reverse rotation occurs when the clutch 19 is energized by energization of its magnet, the transmission of energy in each case being interrupted when the clutch magnet is deenergized.

Selective energization of the clutch magnets is effected by the closure of sensitive contact switches 45 and 46 having a common contact connected to one terminal of a current source 47 and carried by a tongue 48 which is fast on a sleeve 49 loose on the control shaft 6. The other contacts of the switches are mounted to turn with the driven element 5 and are carried in this instance by the gear 3. The common terminals of the clutch windings are connected to the other terminal of the current source 47 and the insulated winding terminals are connected to the separate contacts of the switches 45 and 46. To connect the control shaft 6 and the switch tongue 48 so as to permit yielding in either direction following engagement of one pair of switch contacts, an arm 50 on the shaft 6 carries a follower roller 51 urged by a spring 52 against the surface of a heart-shaped cam 53.

If, with the arrangement above described, the control shaft 6 turns clockwise, the tongue 48 is turned to close the switch 45 before yielding of the connection occurs. The clutch 17 is thus energized and the disk 19 is gripped frictionally so as to turn with the motor and impart rotary motion to the gear train, the driven element 5 following up the motion of the control shaft. This continues until the switch 45 has been opened whereupon the clutch is disengaged. A similar but reverse action takes place in response to closure of the switch 46 which controls the engagement and disengagement of the clutch 16.

By virtue of its friction connection with the driving train, the flywheel 2 constitutes a rotating friction device which acts continuously to overcome any tendency of the parts to oscillate and produce hunting. That is to say, it acts frictionally to resist each energy impulse imparted to the system by engagement of one of the clutches. Similarly, the energy stored in the flywheel tends to carry the load and thereby resist stopping of the driven parts when the clutch is disengaged. As a result of this action, the flywheel tends automatically to attain the average speed of the parts and is very effective in damping out any hunting tendency.

To obtain this damping action, while at the same time causing the driven element to follow closely and precisely the movements of the control element 6, the inertia of the flywheel must be large, preferably five to ten times greater, as compared to that of the driving gear train and the connected parts. Also, the power capable of being transmitted through the clutches must be capable of accelerating the load rapidly and overcoming the inertia of the system and of the flywheel. These requirements are achieved in the present instance through the use of the friction clutches, the driven elements of which, it will be observed, are of very small mass particularly because the magnetic circuit of each clutch is formed by the stationary magnet or the driving elements of the clutch, that is, the ring 33 and the plate 36. As a result, it has been found that the mass of the flywheel 2 that is required to produce effective damping may be reduced greatly as compared to prior systems in which the rotor of the motor contributes to the inertia of the system. With the present system, a much smaller motor may be employed, and the accuracy with which the driven element will follow the controlling element is increased appreciably. Moreover, the current required to energize the clutch windings is very small as compared to that for starting an idle motor. Accordingly, the control switches 45 and 46 may be made much more sensitive and will respond more quickly to the motions of the controlled and driven elements with a resultant improvement in the accuracy with which the driven element follows the control element.

The electromagnetic friction clutch shown in Figs. 2 and 3 forms the subject matter of my copending divisional application filed August 31, 1945, entitled Electromagnetic friction clutch.

I claim as my invention:

1. An actuator for positioning a driven element in accordance with movements of a control element having, in combination, a driving train coupled to said driven element, a flywheel coupled frictionally to a member of said train, a pair of magnetic friction clutches having magnetic windings and thin driven disks coupled to said train for rotation of the latter in opposite directions according to which of the clutches is engaged, the driving element of each clutch comprising a rotary armature on one side of the driven disk and rotary poles on the opposite side, a source of rotary power driving said driving clutch elements, and switching means responsive to the movements of said control and driven elements and controlling the energization and deenergization of said clutch windings selectively to cause the driven element to follow the movements of the control element.

2. An actuator for positioning a driven element in accordance with movements of a control element having, in combination, speed reduction gearing driving said driven element, a flywheel coupled frictionally with a member of said train and operable to dampen oscillations thereof, a pair of rotary friction clutches each having a driving element comprising a thin disk and driven elements adapted to grip the disk between them, said driven disks being geared to said train for rotation of the latter in opposite directions according to which of the clutches is engaged, a source of rotary power driving said driving clutch elements, and devices responsive to the movements of said control and driven elements and controlling the engagement and disengagement of said clutches selectively to cause the driven element to follow the movements of the control element.

3. An actuator for positioning a driven element in accordance with movements of a control element having, in combination, a speed reduction gear train driving said driven element, a flywheel coupled frictionally with a high speed member of said train and operable to dampen oscillations thereof, a pair of friction clutches having driving and driven members, the driven members being geared to said train for rotation of the latter in opposite directions according to which of the clutches is engaged, a source of rotary power driving said driving clutch members and capable of accelerating said flywheel, the driving train, and the load thereon at a desired rate, and devices responsive to the movements of said control and driven elements and controlling the engagement and disengagement of said clutches selectively to cause the driven element to follow the movements of the control element.

4. An actuator for positioning a driven element in accordance with the movements of a control element having, in combination, a source of rotary power, a train of rotary elements for driving said driven element, a flywheel frictionally coupled to one of said rotary elements to impose a frictional damping force thereon, said flywheel having a mass correlated with and many times greater than the inertia of the parts rotatable with said driving train, a pair of friction clutches having driving members driven by said power source and driven members coupled to said rotary elements for rotation in opposite directions, whereby the damping effect of said flywheel is not affected by the inertia of the power source, and means controlling the selective engagement and disengagement of said clutches to cause said driven element to follow the control element precisely.

5. Mechanism for positioning a driven element in accordance with the movements of a control element having, in combination, a rotary electric motor, a clutch having a driving member driven by said motor and a rotary driven member of a mass substantially smaller than that of the rotor of said motor and having a driving connection with said driven element whereby rotary power is transmitted from said motor to said driven element when the clutch is engaged, a flywheel frictionally coupled to said driven clutch member and having a mass substantially greater than and correlated with that of said driven clutch member and the parts rotated thereby whereby to impose a friction damping effect on said connection, and control means responsive to the movements of said control and driven elements to govern the engagement and disengagement of said clutch and cause the driven element to follow the control element.

6. An actuator for positioning a driven element in accordance with the movements of a control element having, in combination, a speed reduction gear train driving said driven element, a flywheel, a slip coupling between said flywheel and a high speed member of said gear train operable during acceleration or deceleration of the gear train to utilize the inertia of the flywheel in applying a drag to said member whereby to dampen oscillations of the latter, a pair of friction clutches having driving and driven members, the driven members being geared to said train for rotation of the latter in opposite directions according to which of said clutches is active, means providing a source of rotary power for driving said driving clutch members and capable of accelerating said flywheel, said gear train, and the load imposed thereon at a desired rate, and a device responsive to the movements of said control element and said driven element and selectively controlling the engagement of said clutches to cause the driven element to follow the movements of the control element.

7. Mechanism for positioning a driven element in accordance with the movements of a control element having, in combination, a rotary electric motor, a clutch having a driving member driven by said motor and a rotary driven member of a mass substantially smaller than that of the rotor of said motor, a speed reducing driving connection between said driven clutch member and said driven element whereby rotary power is transmitted from said rotor to said element when said clutch is energized, a flywheel having a mass substantially greater than and correlated with that of said driven clutch element and the parts rotated thereby, coupling means between said flywheel and an element of said driving connection operable to utilize the inertia of the flywheel to resist acceleration and deceleration of said driven element whereby to impose a damping effect thereon, and control means responsive to the movements of said control and driven elements to govern the engagement and disengagement of said clutch and cause the driven element to follow the control element.

8. Mechanism for positioning a driven element in accordance with the movements of a control element having, in combination, a rotary electric motor, a coupling having a driving member driven by said motor and a rotary driven member of a mass substantially smaller than that of the rotor of said motor, said coupling being energizable selectively to transmit a variable torque, a speed reducing driving connection between said driven member and said driven element whereby rotary power is transmitted from said rotor to said element when said coupling is energized, a flywheel having a mass substantially greater than and correlated with that of the parts rotated by said coupling, coupling means between said flywheel and an element of said driving connection operable to utilize the inertia of the flywheel to resist acceleration and deceleration of said driven element whereby to impose a damping effect thereon, and control means responsive to the movements of said control and driven elements to govern the energization of said coupling and cause the driven element to follow the control element.

9. Mechanism for positioning a driven element in accordance with the movements of a control element having, in combination, a rotary electric motor, a coupling having a driving member driven by said motor and a rotary driven member of a mass substantially smaller than that of the rotor of said motor, electromagnetic means controlling the energization of said coupling, a speed reducing driving connection between said driven member and said driven element whereby rotary power is transmitted from said rotor to said element when the coupling is energized, a flywheel having a mass substantially greater than and correlated with that of the parts rotated by said coupling, coupling means between said flywheel and an element of said driving connection operable to utilize the inertia of the flywheel to resist acceleration and deceleration of said driven element whereby to impose a damping effect thereon, and control means responsive to the movements of said control and driven elements to govern the energization of said electromagnetic means and cause the driven element to follow the control element.

EDGAR D. LILJA.